(12) United States Patent
Bombolowsky

(10) Patent No.: US 9,084,086 B2
(45) Date of Patent: Jul. 14, 2015

(54) MATCHING BASED ON GEOLOCATION INFORMATION FROM A MOBILE APPLICATION

(71) Applicant: Jens Bombolowsky, Schwetzingen (DE)

(72) Inventor: Jens Bombolowsky, Schwetzingen (DE)

(73) Assignee: SAP AG, Walldorf (DE)

( * ) Notice: Subject to any disclaimer, the term of this patent is extended or adjusted under 35 U.S.C. 154(b) by 163 days.

(21) Appl. No.: 13/692,134

(22) Filed: Dec. 3, 2012

(65) Prior Publication Data

US 2014/0155106 A1 Jun. 5, 2014

(51) Int. Cl.
*H04W 24/00* (2009.01)
*H04W 4/02* (2009.01)
*G01C 21/26* (2006.01)

(52) U.S. Cl.
CPC .................................. *H04W 4/028* (2013.01)

(58) Field of Classification Search
CPC ......... H04W 4/028; H04W 4/04; H04W 4/02; H04W 4/25; G01C 21/26; G01C 22/00; G01C 21/30; G01C 21/005; G01C 21/3626; G01C 21/34; G01C 21/343; G01C 21/3476; G06Q 10/047
USPC ................ 455/404.2, 418–421, 432.1, 432.3, 455/433–434, 435.1, 436, 440, 455/456.1–456.3, 456.5–456.6, 457, 517, 455/550.1, 556.2, 414.1, 414.3, 466, 514, 455/557, 560–561; 701/446–447, 450–454, 701/467–472, 487, 491, 513, 516–517, 519, 701/522, 538, 540–54, 540–541, 400–410, 701/430, 433–434, 438, 461, 532–533; 709/203, 219
See application file for complete search history.

(56) References Cited

U.S. PATENT DOCUMENTS

| | | | |
|---|---|---|---|
| 6,295,454 B1* | 9/2001 | Havinis et al. .............. | 455/456.3 |
| 7,756,525 B1* | 7/2010 | Thomas et al. ............. | 455/456.1 |
| 2005/0010787 A1* | 1/2005 | Tarbouriech .................. | 713/185 |
| 2007/0211871 A1* | 9/2007 | Sjolander et al. ............. | 379/133 |
| 2009/0164439 A1* | 6/2009 | Nevins .............................. | 707/3 |
| 2011/0061018 A1* | 3/2011 | Piratla et al. .................. | 715/781 |

* cited by examiner

*Primary Examiner* — Meless Zewdu
(74) *Attorney, Agent, or Firm* — Mintz Levin Cohn Ferris Glovsky and Popeo, P.C.

(57) ABSTRACT

Methods and apparatus, including computer program products, are provided for location matching. The method may include tracking, by the user equipment, a plurality of locations of the user equipment, the plurality of locations mapped to a plurality of time values representative of when the user equipment traversed the plurality of locations; determining, by the user equipment, a first location of the user equipment, wherein the determining is based on a first time value received from an interface; providing, by the user equipment, at least one of the determined first location and the received first time value to a database searchable based on the at least one of the determined first location and the received first time value; and receiving, at the user equipment, an indication of whether the database includes one or more items matching the at least one of the determined first location and the received first time value. Related systems, methods, and articles of manufacture are also disclosed.

15 Claims, 6 Drawing Sheets

MATCHING BASED ON GEOLOCATION INFORMATION FROM A MOBILE APPLICATION

FIELD

The subject matter described herein generally relates to data processing.

BACKGROUND

Geolocation refers to identifying an actual location of an object on a map, on the Earth, and the like. Thus, geolocation finds the position of the object, and in some instances also finds metadata associated with the position, such as street name and the like. Location based services may use navigation information, such as the Global Positioning System (GPS) and any other navigation and positioning system, to provide precise latitude, longitude, time, altitude, and the like, all of which may be used to geolocate the object.

SUMMARY

In some implementations, methods and apparatus, including computer program products, are provided for location matching.

In some implementations, there is provided a method. The method may include tracking, by the user equipment, a plurality of locations of the user equipment, the plurality of locations mapped to a plurality of time values representative of when the user equipment traversed the plurality of locations; determining, by the user equipment, a first location of the user equipment, wherein the determining is based on a first time value received from an interface; providing, by the user equipment, at least one of the determined first location and the received first time value to a database searchable based on the at least one of the determined first location and the received first time value; and receiving, at the user equipment, an indication of whether the database includes one or more items matching the at least one of the determined first location and the received first time value.

In some example embodiments, one of more variations may be made as well as described in the detailed description below and/or as described in the following features. The tracking may further comprise recording the plurality of locations and the plurality of time values. The user equipment may register to grant permission for the tracking to occur. The database may be queried, based on the at least one of the determined first location and the received first time value, to search for one or more items stored at the database. A page may be generated including a description of one or more items matching the at least one of the determined first location and the received first time value.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein, and, together with the description, help explain some of the principles associated with the subject matter disclosed herein. In the drawings.

DETAILED DESCRIPTION

A mobile device (also referred to herein as user equipment) may include a location processor, such as a global positioning system (GPS) processor and the like, to provide location information representative of the geolocation of the mobile device. Moreover, an application resident on the mobile device may receive location information to enable providing a service.

In some example implementations, the resolution of the location information may vary from very precise, high-resolution location information to lower-resolution, general location information. The differences in location information resolution may pose a challenge to applications that seek to match locations as the locations may not match exactly from a mathematical perspective but rather match from a logical perspective when the locations are in fact the same or very similar. For example, a first position may have a very precise, high-resolution GPS location, and a second position may have less resolution. In this example, although the first position and second position correspond to the same physical location on a map, a matching algorithm seeking an exact mathematical match based solely on the locations may not be able to determine that the first and second positions are the same or similar.

The subject matter disclosed herein may relate to a geolocation application at the mobile device configured to programmatically record the location of the user equipment over a certain time period. This time information may be used to augment the location-related processes discloses herein.

Figure 1:
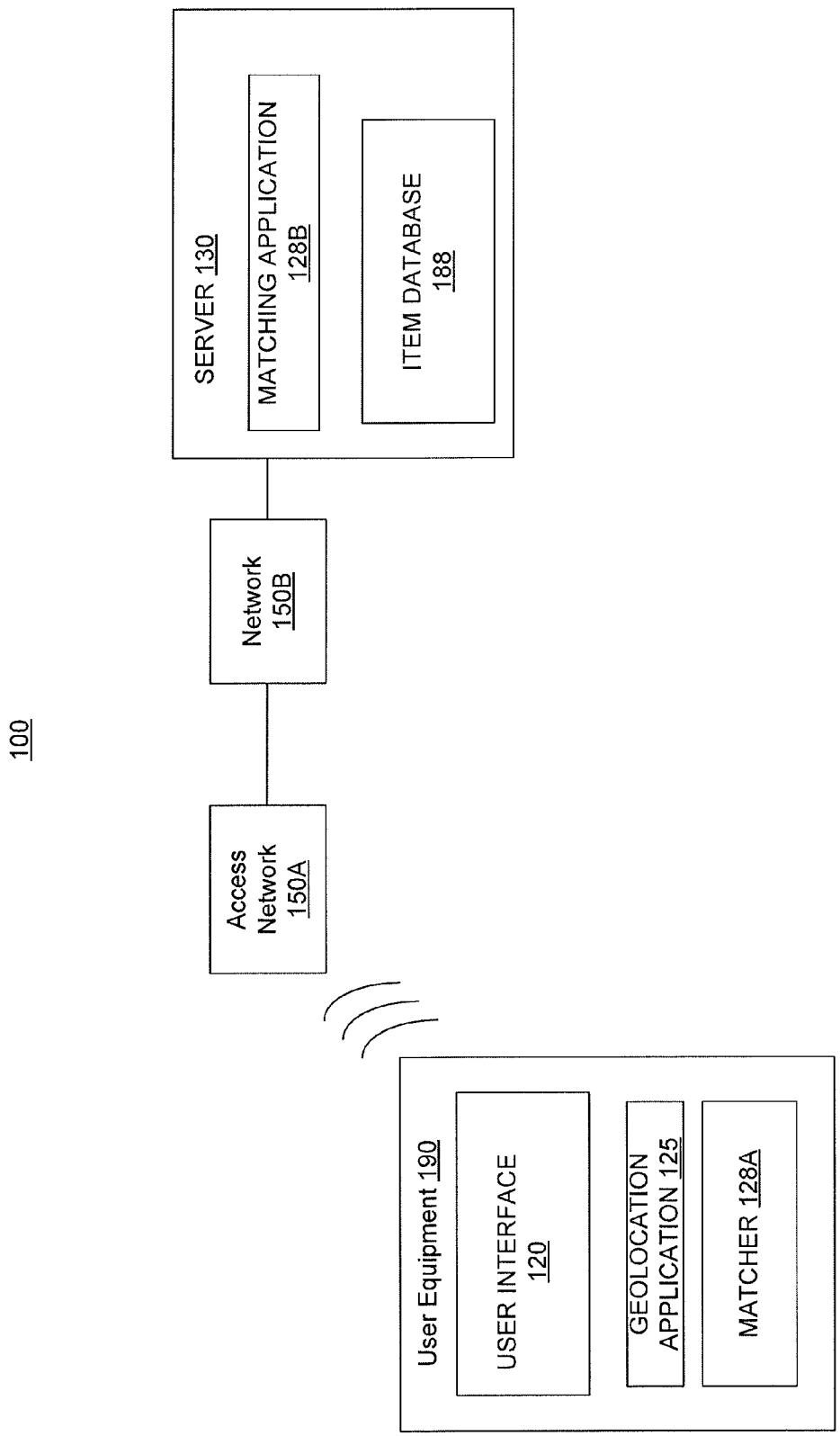
FIG. 1 illustrates a block diagram of an exemplary system including user equipment, in accordance with some example implementations.

FIG. 1 depicts a system 100 including a mobile device, such as user equipment 190. The user equipment 190 may include a user interface 120, a geolocation application 125, and a matcher 128A. The user equipment 190 may wirelessly couple to an access network 150A, such as a cellular network, a wireless local area network (e.g., WiFi), and the like. Moreover, the access network 150A may further couple to one or more other networks 150B, such as the Internet. Server 130 may couple to network 150B and include a matching application 128B and an item database 188.

The user interface 120 may be implemented as a browser, a thin client, and/or any other mechanism to enable interaction between a user and user equipment 190.

The geolocation application 125 may record the position of the user equipment. For example, the geolocation application 125 may receive from a location processor, such as a global positioning system processor at the user equipment, the location of the user equipment 190 at one or more instances of time. In some implementations, the geolocation application 125 may be activated and record the user equipment's location at one or more times to provide a record of the user's location. Accordingly, for any given time, the location of the user equipment 190 may also be determined from the location information recorded at the user equipment 190.

The matcher 128A may obtain location and/or time information from the geolocation application 125 and forward the obtained information to matching application 128B, which is further described below. The matcher 128A may also receive search results from matching application 128B and item database 188 and may also generate pages for presentation at the user interface 120. For example, the matcher 128A may be used to access matching application 128B at server 130. If a user wants to identify an item stored at item database 188 based on location information and/or time recorded by geolocation application 125, matcher 128A may provide the location information and/or time to server 130, so that matching application 128B can query items database 188 for items that have location and/or time information matching the user equipment's recorded information.

In some implementations, the matcher 128A may, as noted, provide to matching application 128B one or more time values instead of, or in addition to, the location information. These time values may represent time stamps recording the times at which the location measurements are made, or received, for the locations of the user equipment 190.

Figure 2:
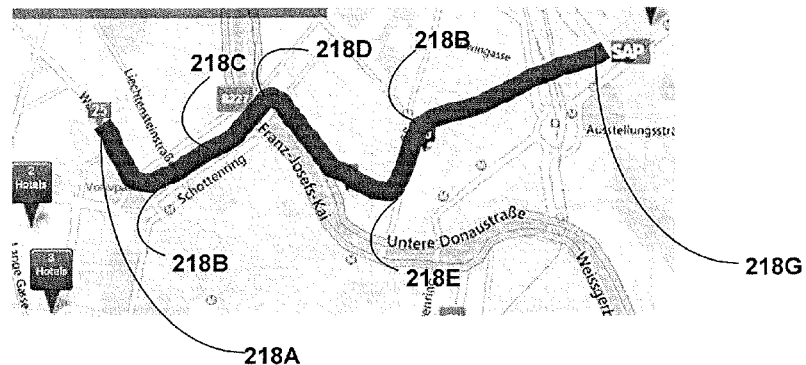
FIG. 2 illustrates examples of location information, in accordance with some example implementations.
Figure 2:
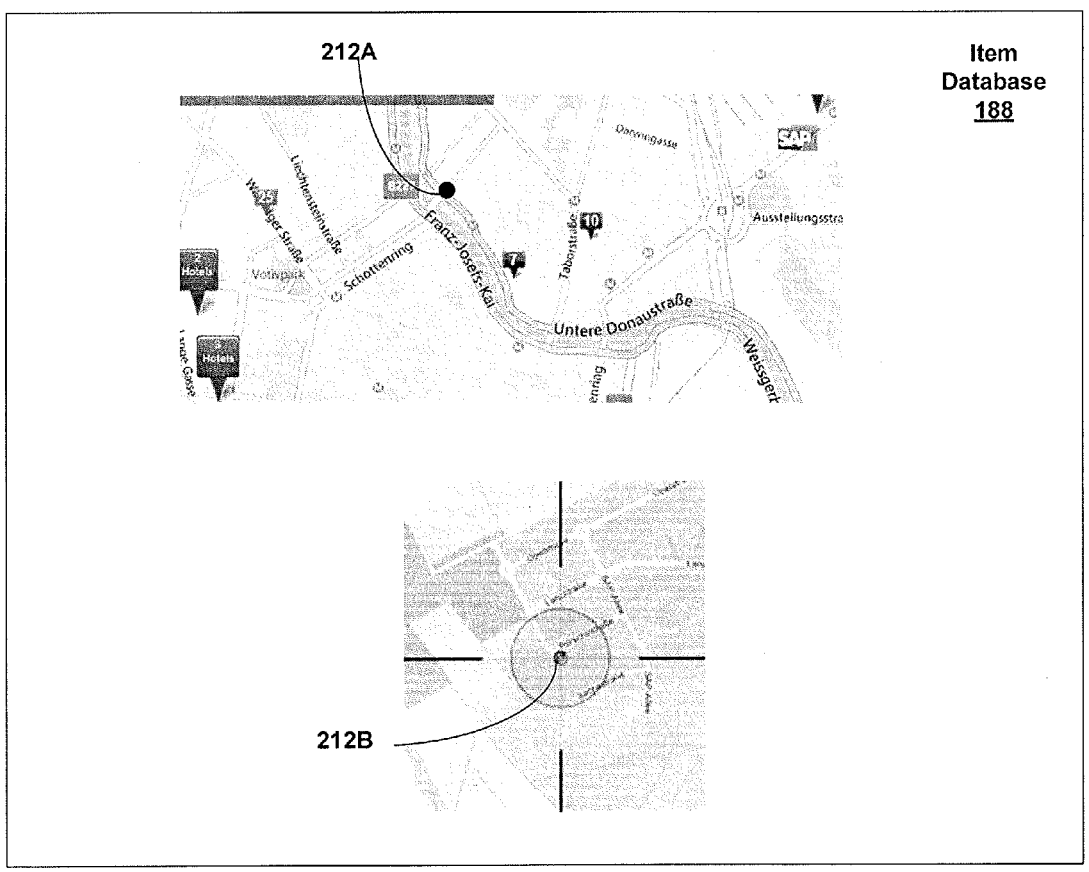

FIG. 2 described further below depicts the locations of user equipment 190 recorded over a timeframe as the user equipment 190 moves from position 218A to 218G. The geolocation application 125 may periodically record the user equipment's location at 218A-G and each time the location is recorded a time value, such as a time of day and date may be recorded. In some implementations, the location information 218A-G and corresponding time may be stored as a path from location 218A through 218G. In this example, matcher 128A may provide to matching application 128B the user equipment's 190 recorded location, such as latitude, longitude, and the like, at locations 218A-G (as well as location between 218G).

Once received, the matching application 128B may access the item database 188 to query for one or more items stored in the item database 188. The query may be based on one or more of the location information received from the user equipment and the corresponding times for the location information.

For example, the item database 188 may include a first item having a single point location 212A, a second item having another single point location 212B, and so forth. In this example, matcher 128A may provide to matching application 128B the user equipment's 190 recorded location (which may also include one or more time values for the locations) as a path from location 218A-218G. The matching application 128B may then query for items stored in item database 188 that match location 218A-218G, and identify item 212A as a match since the user equipment's 190 path from location 218A-218G is the same, or similar to, the location 212A. Moreover, the matching may include a search based on time values. For example, the location 218A-218G may represent the location of the user equipment on Aug. 1, 2012, at one or more times between 0600 and 0630 hours and, as such, matching application 128B may, in this example, search for items in item database based on one or more of the following: the locations 218A-G; a date, such as Aug. 1, 2012; and/or a time, such as 0600-0630 hours (e.g., items in database 188 with a time values the same, before, and/or after 0600-630 hours on Aug. 1, 2012).

Server 130 may, in some implementations, provide a lost and found service. In this example, item database 188 may include found items reported and stored at items database 188 to allow users that have lost an item to query the item database 188. So if a user finds an item, the user may access server 130 via network 150B and provide to item database 188 the location of where the item was found and/or a time (or period) when the item was found. Likewise, when a user finds an item, the user may access server 130 via network 150B and provide the location of where the item was lost and/or a time (or period) when the item was lost to enable a search of the item database 188.

To illustrate, if a user knows only the general time frame, the user may provide a time frame at user interface 120, which allows geolocation application 125 to determine the location of the user at the provided time. Referring to the previous example, if the user enters at user interface 120 a date and time, such as Aug. 1, 2012, between 0600 and 0630, the geolocation application 125 may provide location information corresponding to locations 218A-G. This location information 218A-G and/or the time information may be sent to the matcher 128A and matching application 128B to allow formation of a query of item database 188 for found items stored at item database.

When the matching application 128B receives the location information and/or time information, the matching application 128B may then query the item database 188 including one or more lost items stored therein based on the received location information and/or time information. For example, the query may determine possible lost items stored in item database based on matching location and time, so that possible location matches exclude found items recorded in the item database which were found before the lost item was lost (as indicated by the time values of the lost and found items). In this example, the matching application 128B searches for found items in items database 188 having the same or similar locations as the lost item stored in items database 188 (e.g., when the locations match) and/or based on time (e.g., based on the time the item was lost and the time the item was found). If there is at least one match, matching application 128B may send matching item(s) to user equipment 190 (including matcher 128A), where the user interface 120 presents information representative of the matching item(s).

Although the previous example refers to several locations 218A-G forming a path, the location information for the user's lost item may comprise a single point location (e.g., from geolocation application 125) or a more general location (e.g., a street name, an intersection, a place of interest, and the like), and this location information may also be associated with one or more time values indicating when the user equipment 190 was at a given location (or, e.g., when the location information was received at, and/or recorded by, the user equipment 190 including the geolocation application 125). Moreover, the geolocation application 125 may, in some implementations, be configured to provide resolution that is equivalent to the resolution being used at the service, such as item database 188.

In some implementations, the geolocation application 125 may be configured to run in a background mode to programmatically capture location information and time values as the user equipment moves. As such, when the user of user equipment 190 loses an item, the user can just enter a time range in user interface 120, which forwards the time to matcher 128A to access geolocation application 125 to programmatically identify one or more locations where the user/user equipment were located at the given time. These one or more locations may be provided, as noted, to matching application 128B to search for items in item database 188 or even log the location of an item. In the lost and found service example, a user finding an item may provide the location and/or time associated with the found item, while a user that has lost an item provides locations and/or times associated with the lost item.

In some implementations, the geolocation application 125 may programmatically capture location information and provided the information to server 130 including matching application 128B, where the location information, time, and user identity can be stored. In this implementation, when the user of user equipment 190 loses an item, the user may enter a time range in user interface 120, which forwards the time to server 130 including matching application 128B to programmatically identify one or more locations where the user/user equipment was located at the given time and generate a query, based on time and/or location of item database 188.

Figure 3A:
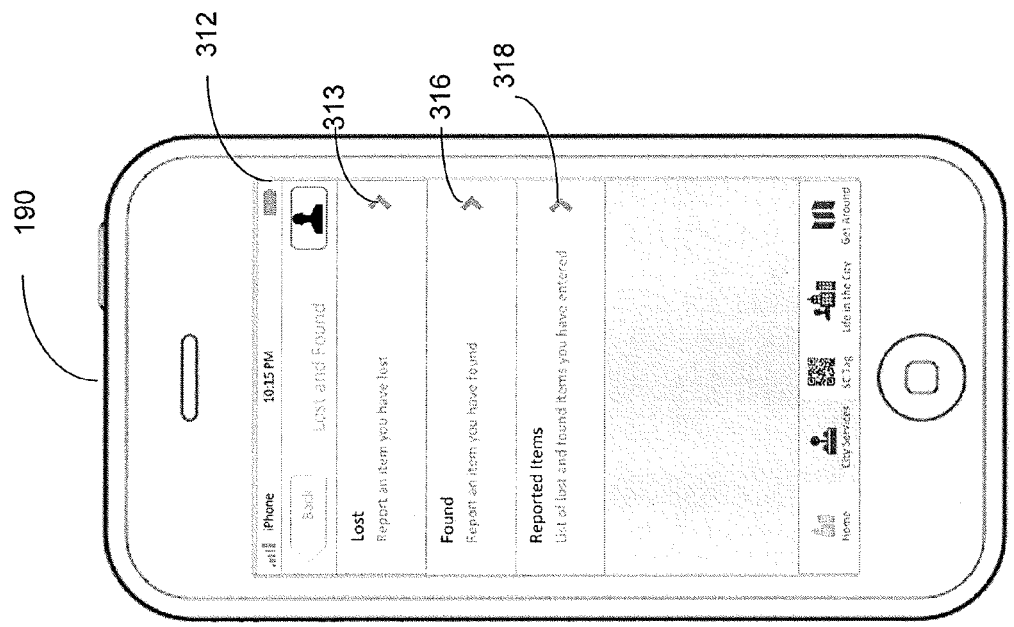
FIGS. 3A-3C depicts examples of user interfaces used in connection with a lost and found application, in accordance with some example implementations.

FIG. 3A depicts an example of user equipment 190 including a page 312, which may be presented at user interface 120. Page 312 includes a user interface element 313 which when selected, allows a user interface to provide information regarding a lost item to matcher 128A and matching application 128B via a second page 390 (described further below). This information may enable a search for lost items stored at items database 188. Page 312 also includes a user interface element 316 which when selected, allows a user interface via another page to provide information regarding a found item to matcher 128A and matching application 128B. For example, if someone that has found an item that does not belong to them, that person may want to report the found item by selecting 316, while someone that has lost an item may seek the item by selecting 313. Page 312 also includes a user interface element 318 which when selected, generates a list of one or more lost items stored at item database 188.

Figure 3B:
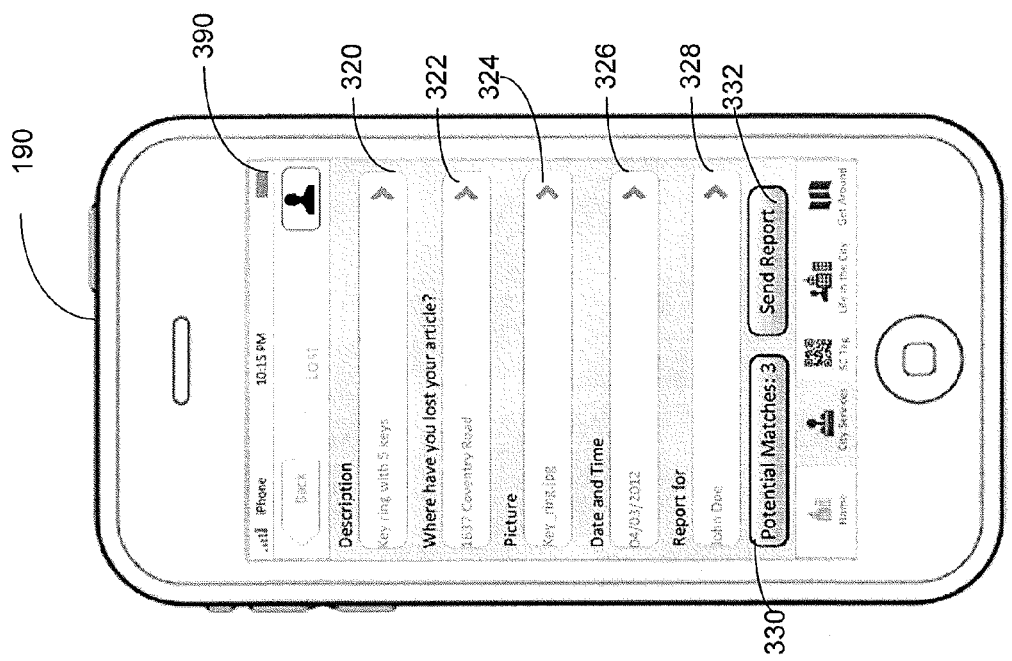

FIG. 3B depicts an example of user equipment 190 including a page 390, which may be presented at user interface 120. Page 390 may be presented after a user selects user interface element 313. When 313 is selected, user interface 120 may present page 390, so that a person reporting the loss may provide one or more of the following: a description of the list item 320, where the item was lost 322, a picture of the lost item 324, a date and time of the loss 326, and the person reporting the loss 328. In some implementations, the matcher 128A may obtain stored location information for the user based on the date and time 326, and then provides the location(s) for the date and time 326 to matching application 128B for storage and/or search of item database 188. The matcher 128A may also provide one or more of the information 320-238 to matching application 128B to facilitate the query of the item database 188. Page 390 also includes an icon 330 representative of potential matches, which in this example is "3." The potential matches may be provided by item database 188 to matching application 128B. In any case, when icon 330 is selected, the potential matches are presented at user interface 120 as a different page. When the user selects the send icon 332, one or more of the information 320-238 and the location obtained from the geolocation application 125 for the relevant time period at 326 (which in this example is Apr. 03. 2012) may be forwarded to matching application 128B to facilitate storage and or searching of item database 188.

Figure 3C:
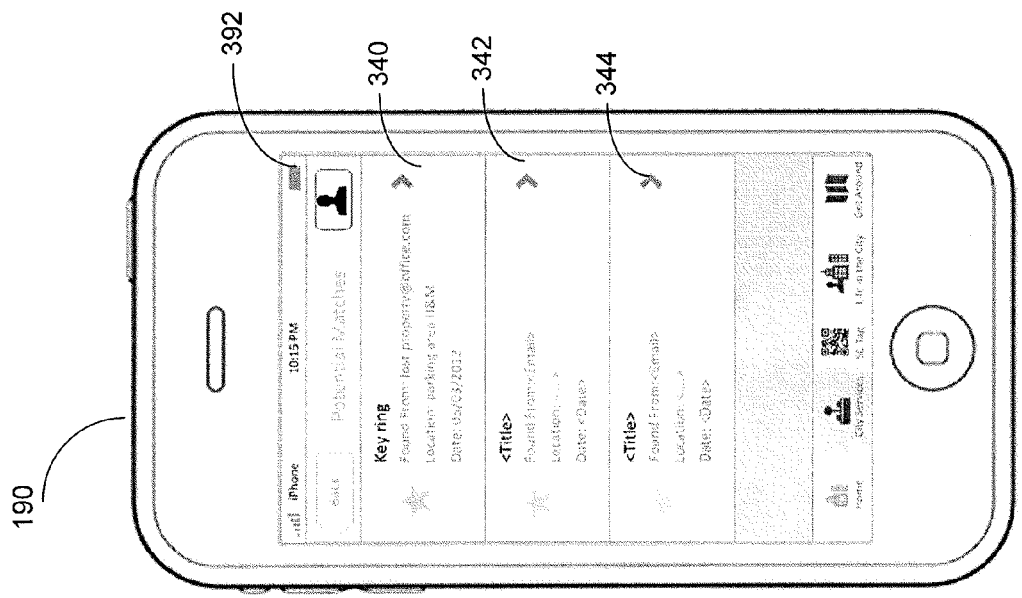

FIG. 3C depicts an example of user equipment 190 including a page 392 presented at user interface 120. Page 392 may be presented after the matching application 128B provides one or more matching items identified based on location and/or time to user equipment 190 and matcher 128A. Page 392 may be presented after the potential matches icon 330 is presented.

Figure 4:
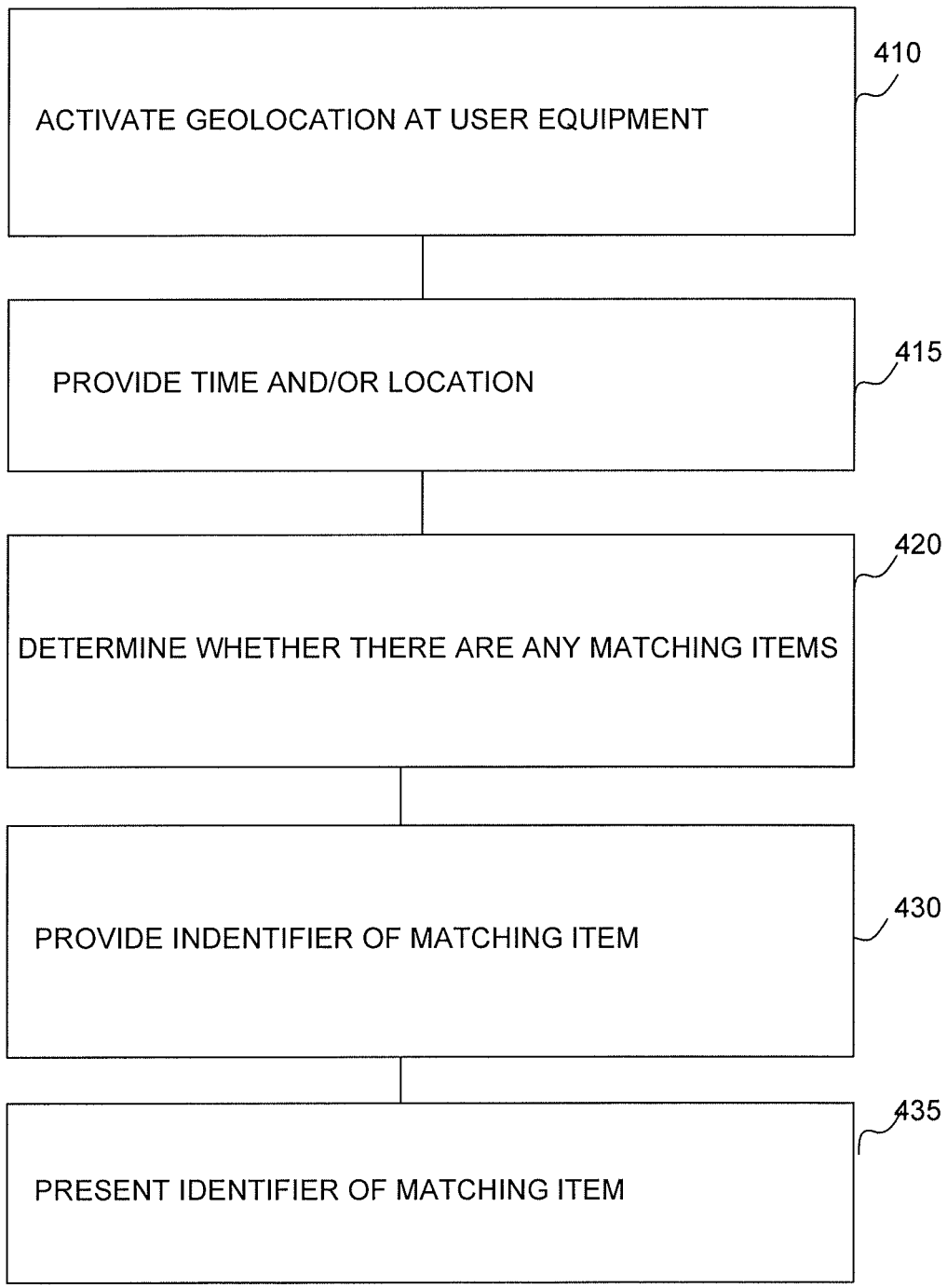
FIG. 4 illustrates a process for providing a mobile enterprise services framework, in accordance with some example implementations.

FIG. 4 depicts a process 400 for matching items based on time and/or location obtained programmatically from a location processor at a user equipment. The description of process 400 also refers to FIGS. 1, 2, and 3B-3C.

At 410, geolocation at the user equipment may be activated. For example, a user may activate geolocation application 125, so that it records location information for user equipment 190. Moreover, the location information may be recorded programmatically and the recorded information may be associated with time values, so that a time of day may identify a location of the user equipment (or a time frame may identify locations). In some implementations, the user equipment 190 may be required to opt-in by acknowledging activation of the tracking performed by geolocation application 125 and/or by registering at server 130 to opt-in to the tracking performed at system 100.

At 415, time information and/or location information on may be provided to server 130. For example, a user may provide to user interface 120 a time 326 at page 390. The matcher 128A may then receive the provided time and retrieve, based on the provided time, one or more locations recorded at geolocation application for user equipment 190. The time and/or location may then be forwarded by the matcher 128A to the matching application 128B to initiate a search of item database 188.

At 420, the matching application 128B may determine whether there are any matching items by querying items database for items that match at least one of the time and/or location forwarded at 415. For example, matching application 128B may query items database 188 for items that match one or more locations (or geo code for those locations), such as locations associated with path 218A-218G. Moreover, matching application 128B may query items database 188 for items based on time. For example, the path 218A-218G may have been traversed on Aug. 7, 2012, so matching database 188 may disregard items reported found before the time the item was lost.

At 430, the matching application 188 may provide identifiers for any items identified as possible matches to at least one of the time and/or location forwarded at 415. Next, the user interface may present, at 435, the matching item(s) on, for example, page 392 at user interface 120.

Referring again to FIG. 1, the user equipment 190 may be implemented as a mobile device, although it may be stationary as well. The user equipment 190 may be referred to as, for example, a mobile station, a mobile unit, a wireless terminal, a tablet, a smart phone, or the like. In some implementations, user equipment 190 may include a processor, a computer-readable storage medium (e.g., memory, storage, and the like), a radio access mechanism configured to couple to a wireless network, and/or a user interface. Moreover, the storage medium may include instructions, such as code, which when executed provides user interface 120, matcher 128A, and geolocation application 128.

The server 130 may include one or more processors, such as computers, to interface with other processors, such as user equipment 190. The server 130 may also include a computer-readable storage medium (e.g., memory, storage, and the like) including instructions, such as code, which when executed provides the matching application 128B and/or item database 188. In some implementations, the server 130 is coupled to networks 150A-B.

The access network 150A may include one or more of a cellular network, a public land mobile network, a wireless local area network, such as a WiFi network, and the like. For example, the access network 150A may include one or more wireless links to a wireless access point, such as a cellular base station or a WiFi access point. The wireless access point may be further coupled to other networks, including the Internet, other wired networks, and/or any other network. In some exemplary implementations, user equipment 190 is a mobile device accessing wireless access network 150A via a cellular base station and/or WiFi wireless local area network access point. In this example, the cellular base station and/or WiFi wireless local area network access point may be coupled to other networks including wired and/or wireless networks, some of which may include the Internet, coupled to server 130.

Although FIG. 1 shows a single user equipment 190, a single access network 150A, a single network 150B, and a single server system 130, other quantities and configurations of user equipment, networks, and servers (as well as the components therein) may be used as well.

Although some of the examples described herein refer to the position information comprising global positioning system location information, any other type and/or source of location information may be used as well.

Although some of the examples described herein refer to a lost and found service, other services may be provided utilizing location and/or time information to identify items in a database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    tracking, by the user equipment, a plurality of locations of the user equipment, the plurality of locations mapped to a plurality of time values representative of when the user equipment traversed the plurality of locations;
    determining, by the user equipment, a path comprising the plurality of locations of the user equipment, wherein the determining is based on a range of time values received from an interface;
    providing, by the user equipment, at least one of the determined path and the received range of time values to a database searchable based on the at least one of the determined path and the received range of time values; and
    receiving, at the user equipment, an indication of whether the database includes one or more items matching the at least one of the determined path and the received range of time values.

2. The method of claim 1, wherein the tracking further comprises:
    recording the plurality of locations and the plurality of time values.

3. The method of claim 1 further comprising:
    registering, by the user equipment, to grant permission for the tracking to occur.

4. The method of claim 1 further comprising:
    querying, based on the at least one of the determined path and the received range of time values, the database to search for one or more items stored at the database.

5. The method of claim 1 further comprising:
generating a page including a description of one or more items matching the at least one of the determined path and the received range of time values.

6. A system comprising:
at least one processor; and
at least one memory including code, which when executed by the at least one processor provides operations comprising:
- tracking, by the user equipment, a plurality of locations of the user equipment, the plurality of locations mapped to a plurality of time values representative of when the user equipment traversed the plurality of locations;
- determining, by the user equipment, a path comprising the plurality of locations of the user equipment, wherein the determining is based on a range of time values received from an interface;
- providing, by the user equipment, at least one of the determined path and the received range of time values to a database searchable based on the at least one of the determined path and the received range of time values; and
- receiving, at the user equipment, an indication of whether the database includes one or more items matching the at least one of the determined path and the received range of time values.

7. The system of claim 6, wherein the tracking further comprises:
recording the plurality of locations and the plurality of time values.

8. The system of claim 6 further comprising:
registering, by the user equipment, to grant permission for the tracking to occur.

9. The system of claim 6 further comprising:
querying, based on the at least one of the determined path and the received range of time values, the database to search for one or more items stored at the database.

10. The system of claim 6 further comprising:
generating a page including a description of one or more items matching the at least one of the determined path and the received range of time values.

11. A non-transitory computer-readable storage medium including code which when executed causes operations comprising:
- tracking, by the user equipment, a plurality of locations of the user equipment, the plurality of locations mapped to a plurality of time values representative of when the user equipment traversed the plurality of locations;
- determining, by the user equipment, a path comprising the plurality of locations of the user equipment, wherein the determining is based on a range of time values received from an interface;
- providing, by the user equipment, at least one of the determined path and the received range of time values to a database searchable based on the at least one of the determined path and the received range of time values; and
- receiving, at the user equipment, an indication of whether the database includes one or more items matching the at least one of the determined path and the received range of time values.

12. The non-transitory computer-readable storage medium of claim 11, wherein the tracking further comprises:
recording the plurality of locations and the plurality of time values.

13. The non-transitory computer-readable storage medium of claim 12 further comprising:
registering, by the user equipment, to grant permission for the tracking to occur.

14. The non-transitory computer-readable storage medium of claim 12 further comprising:
querying, based on the at least one of the determined path and the received range of time values, the database to search for one or more items stored at the database.

15. The non-transitory computer-readable storage medium of claim 12 further comprising:
generating a page including a description of one or more items matching the at least one of the determined path and the received range of time values.

* * * * *